(12) United States Patent
Xu et al.

(10) Patent No.: US 11,223,089 B2
(45) Date of Patent: Jan. 11, 2022

(54) HEAT-RESISTANT MULTI-LAYER COMPOSITE LITHIUM-ION BATTERY SEPARATOR, AND COATING DEVICE AND MANUFACTURING METHOD FOR SAME

(71) Applicant: HEBEI GELLEC NEW ENERGY MATERIAL SCIENCE&TECHNOLOGY CO., LTD., Hebei (CN)

(72) Inventors: Feng Xu, Hebei (CN); Haichao Yuan, Hebei (CN); Yunfei Deng, Hebei (CN); Wenxian Ma, Hebei (CN)

(73) Assignee: HEBEI GELLEC NEW ENERGY MATERIAL SCIENCE & TECHNOLOGY CO., LTD., Handan (CN)

( * ) Notice: Subject to any disclaimer, the term of this patent is extended or adjusted under 35 U.S.C. 154(b) by 94 days.

(21) Appl. No.: 16/320,474

(22) PCT Filed: Sep. 13, 2017

(86) PCT No.: PCT/CN2017/101564
§ 371 (c)(1),
(2) Date: Jan. 24, 2019

(87) PCT Pub. No.: WO2018/050067
PCT Pub. Date: Mar. 22, 2018

(65) Prior Publication Data
US 2019/0267598 A1    Aug. 29, 2019

(30) Foreign Application Priority Data

Sep. 13, 2016 (CN) .......................... 201610817965.9
Sep. 13, 2016 (CN) .......................... 201610817987.5

(51) Int. Cl.
*H01M 10/05*    (2010.01)
*H01M 50/40*    (2021.01)
(Continued)

(52) U.S. Cl.
CPC ............. *H01M 50/449* (2021.01); *B05C 1/08* (2013.01); *H01M 10/0525* (2013.01);
(Continued)

(58) Field of Classification Search
None
See application file for complete search history.

(56) References Cited

U.S. PATENT DOCUMENTS

2001/0004502 A1*   6/2001   Nakamizo ........... H01M 2/1666
                                                           429/94
2014/0234538 A1*   8/2014   Yamada .................. B32B 27/08
                                                         427/126.4

FOREIGN PATENT DOCUMENTS

CN        103691626 A      4/2014
CN        104022247 A *   9/2014            H01M 2/16
(Continued)

*Primary Examiner* — Barbara L Gilliam
*Assistant Examiner* — Angela J Martin

(57) ABSTRACT

A heat-resistant multi-layer composite lithium-ion battery separator, and coating device and manufacturing method for same. The battery separator comprises a base membrane (12) having two end faces provided with a coating paste, and the end faces of the base membrane (12) are both adhered with a composite layer via the coating paste. The composite layer comprises one, two, or multiple composite films (13). The composite films (13) are adhered and fixed via the coating paste. The coating device is employed during the manufacturing, and comprises a base membrane uncoiling reel (1), a coating roller (2), a composite film uncoiling mechanism, a heating and drying mechanism, and a coiling reel (6). The coating roller (2) is arranged in a one-to-one correspondence to the composite film uncoiling mechanism, (Continued)

and two sets of the coating roller and the composite film uncoiling mechanism are provided on two sides of the base membrane (12). The composite film uncoiling mechanism comprises a composite film uncoiling reel (3) and a pressing shaft (4), and the composite films (13) are attached to the base membrane (12) after passing through the pressing shaft (4) to form a multi-layer composite separator, and then heated, dried, and shaped to obtain a separator final product. The separator final product has superior heat-resistant stability and a heat-resistant rate of contraction.

1 Claim, 1 Drawing Sheet

(51) Int. Cl.
*H01M 50/44* (2021.01)
*H01M 50/449* (2021.01)
*H01M 10/0525* (2010.01)
*B05C 1/08* (2006.01)
*H01M 50/403* (2021.01)
*H01M 50/411* (2021.01)
*H01M 50/431* (2021.01)

(52) U.S. Cl.
CPC ....... *H01M 50/403* (2021.01); *H01M 50/411* (2021.01); *H01M 50/431* (2021.01); *H01M 50/44* (2021.01); *H01M 2220/20* (2013.01)

(56) References Cited

FOREIGN PATENT DOCUMENTS

| | | |
|---|---|---|
| CN | 106129312 A | 11/2016 |
| CN | 106207052 A | 12/2016 |
| CN | 206022493 U | 3/2017 |
| CN | 106953050 A | 7/2017 |
| JP | 2000042384 A | 2/2000 |

\* cited by examiner

HEAT-RESISTANT MULTI-LAYER COMPOSITE LITHIUM-ION BATTERY SEPARATOR, AND COATING DEVICE AND MANUFACTURING METHOD FOR SAME

TECHNOLOGY FIELD

The invention belongs to the technical field of lithium-ion battery, particularly, the invention relates to a heat-resistant multi-layer composite lithium-ion battery separator, and coating device and manufacturing method for same.

BACKGROUND ART

The basic function of the battery separator in lithium-ion battery is to separate the anode and the cathode of the battery and to absorb electrolyte to allow the lithium-ion passing through. Computer, Communication and Consumer Electronics (3C Products) are the main application fields of the lithium-ion battery. For the lithium-ion battery in 3C Products, only PP separator and PE separator can be used to achieve better performance. However, with the increasing development of the electric vehicles, performances of the lithium-ion battery should be further improved to meet the requirements of electric vehicles, for example, in terms of the safety performance, charge and discharge performance, cycle performance, rate capability and etc., lithium-ion batteries for electric vehicles have stricter requirements than lithium-ion batteries for 3C Products. At present, development and study on the performance improvement of the lithium-ion battery focused on improving the surface properties of the separator and adjusting the separator base material. In the improvement of the surface properties of the separator, the main research direction is the separator coating treatment, that is, coating a layer of ceramic material on the surface of the separator, in the present situation, ceramic coating separator is the best way to improve the safety performance of the lithium-ion battery, after coating ceramic, the heat-resistant shrinking performance, safety performance, heat-resistant stability can be effectively improved and the mechanical strength of the separator is improved, thereby the service life of the separator is extended.

In order to further make the performance of the battery separator meet the requirements of the power lithium-ion battery, the manufacturing method for the new lithium-ion battery separator, such as the composite of nonwovens and coating membrane, has received more and more attention. The base materials of nonwovens are variety and comprise PP nonwovens, fibrin nonwovens, PET nonwovens, etc., PET nonwovens have the best heat-resistant and mechanical performance among the above-mentioned nonwovens, and therefore, there have been many studies on PET nonwovens. In the present situation, heat-resistant performance and heat-resistant shrinking rate of the ceramic coating separator can not meet the requirements under certain temperature conditions, and the composite of PET nonwovens and ceramic coating separator can greatly improves the heat-resistant stability and the heat-resistant shrinking rate, thereby increasing the market competitiveness, however, there is no relatively mature method for preparing the composite separator in the prior art.

SUMMARY OF THE INVENTION

In order to overcome the deficiency of prior art, the invention provides a heat-resistant multi-layer composite lithium-ion battery separator, a coating device for the heat-resistant multi-layer composite lithium-ion battery separator and a manufacturing method for the heat-resistant multi-layer composite lithium-ion battery separator.

The heat-resistant performance and heat-resistant shrinking rate of the battery separator in the invention is better, which greatly improves the safety performance, and is suitable for use in lithium-ion battery for electric vehicles. The coating device can be provided with composite films on both sides of the base membrane, and can form a multi-layer composite structure separator after adhesion and heat-based drying, and the composite structure is relatively stable and the production efficiency thereof is high. A manufacturing method for the invention adopting the coating device is time-saving and labor-saving and has a high production efficiency, and the product thereof has high quality and good stability.

According to the first aspect of the invention, the invention provides a heat-resistant multi-layer composite lithium-ion battery separator, comprising: a base membrane having two end faces provided with a coating paste, wherein the end faces of the base membrane are both adhered with a composite layer via the coating paste, the composite layer comprises one, two, or multiple composite films, the composite films are adhered and fixed via the coating paste.

According to the second aspect of the invention, the invention provides a coating device for the heat-resistant multi-layer composite lithium-ion battery separator, the coating device comprises a base membrane uncoiling reel, a coating roller, a heating and drying mechanism, and a coiling reel, which are arranged in sequence, the base membrane uncoiling reel is wound with the base membrane, and one end of the base membrane is protruded from the base membrane uncoiling reel and is wound on the coiling reel, the surface of the coating roller is provided with the coating paste, wherein a composite film uncoiling mechanism comprising composite films is additionally provided and wound between the coating roller and the heating and drying mechanism, on the same side of the base membrane, the coating roller is arranged in an one-to-one correspondence to the composite film uncoiling mechanism to form an attaching unit of the composite films, the attaching unit is two sets provided on two sides of the base membrane, the composite film uncoiling mechanism comprises a composite film uncoiling reel and a pressing shaft, and the composite films are protruded from the composite film uncoiling reel and attached to the base membrane after passing through the pressing shaft, the coating roller and the pressing shaft are pressed against the end face of the base membrane on the corresponding side.

According to the third aspect of the invention, the invention provides a manufacturing method for the heat-resistant multi-layer composite lithium-ion battery separator, the manufacturing method employs the coating device, the structure of the coating device described above is employed during manufacturing heat-resistant multi-layer composite lithium-ion battery separator, and the manufacturing method comprises the following steps:

A. base membrane uncoiling: the base membrane uncoiling reel protrudes the base membrane, and the base membrane moves towards the coiling reel, the uncoiling tension of the base membrane uncoiling reel against the base membrane is 15-30N;

B. base membrane coating: the base membrane passes through the coating roller on both sides, the coating roller is pressed against the end face of the base membrane on the corresponding side, and corresponding end face of the base membrane is provided with the coating paste to form coating separator;

C. multi-layer composite: the coating separator passes through composite film uncoiling mechanism arranged on both sides thereof, the composite film uncoiling reel rotates and protrudes the composite films, the uncoiling tension of the composite film uncoiling reel against the composite films is 15-30N, the composite films is attached to corresponding end face of the coating separator after passing through the pressing shaft, and the pressing shaft are pressed against the attaching position to form a multi-layer composite separator;

D. multiple composite: with each additional layer of the composite films on the end face of the coating separator, it is necessary to repeat steps B and C once, and after the outermost composite film is attached, the next process is proceeded after a delivery time of 0.2-0.5 s;

E. heating and shaping: putting the multi-layer composite separator into the heating and drying mechanism, and the time of conveying through the heating and drying mechanism is 0.6-1.8 min, the tension of the multi-layer composite separator in the heating and drying mechanism is maintained at 7-15N, the final product of multi-layer composite lithium-ion battery separator is obtained after heating and shaping the multi-layer composite separator;

F. product coiling: coiling the multi-layer composite lithium-ion battery separator through the coiling reel, and the coiling tension is 4-12N, In the invention, the composite films are adhered to the base membrane via the coating paste to form multi-layer composite lithium-ion battery separator, the battery separator not only has the high safety performance of the ceramic coating separator, but is also heat-resistant, the battery separator can reduce the shrinking rate of the separator under high temperature conditions, which increases the overall life of the battery.

The invention provides a mature and stable coating device for the heat-resistant multi-layer composite lithium-ion battery separator, the device has a simple structure, and each component unit is a relatively common device, and the cost is low. After adhesion, heat-based drying and shaping, the final finished product is stable and of high quality.

The conventional heat-resistant multi-layer composite separator needs to be coated with paste such as aluminium oxide on a common separator to form a heat-resistant separator, and then the desired composite film is formed into a heat-resistant multi-layer composite separator by the use of an adhesive in a composite machine. However, the invention adopts the manufacturing method of the coating device, because when the base membrane is coated with the ceramic paste, and the desired composite separators are directly adhered together by the adhesiveness of the paste, and the heat-resistant multi-layer composite lithium-ion battery separator is directly formed after being heated and dried in the oven, wherein the processes of coating, adhesion, and composite are completed simultaneously in one process, which greatly improves the production efficiency.

The manufacturing method of the invention provides a relatively mature and efficient process for the heat-resistant multi-layer composite lithium-ion battery separator, wherein the automation degree is high during operation, which can stably and continuously provides raw materials of separator for the battery production, and the final finished product of the multi-layer composite separator has higher quality and stable performance, especially in the lithium-ion batteries used in electric vehicles, the separator can withstand higher temperatures during the operation of the electric vehicles, and the separator shrinking rate is significantly lower than that of the prior ceramic coating separator, thereby the overall life of the battery is significantly prolonged, the safety performance is improved, and the convenience, safety, and stability of the electric vehicles are also improved.

| Reference numbers of accompanying drawings: | | | |
|---|---|---|---|
| 1 | base membrane uncoiling reel | 2 | coating roller |
| 3 | composite film uncoiling reel | 4 | pressing shaft |
| 5 | oven | 6 | coiling reel |
| 7 | charging pump | 8 | coating trough |
| 9 | flattening roller | 10 | tensioning roller |
| 11 | tensioning reel | 12 | base membrane |
| 13 | composite films | 14 | rotating shaft |
| 15 | doctor blade | 16 | raw material barrel |
| 17 | recycling barrel | 18 | overflow port |

SPECIFIC EMBODIMENTS OF THE INVENTION

The endpoints and any values of the scope disclosed in the invention are not limited to the precise scope and values herein, such scope or values should be understood to include values that are close to the scope or values herein. For values ranges, the endpoint values of the various ranges, the endpoint values of the various ranges and the individual point values, and the individual point values can be combined with one another to yield one or more new values ranges, and these ranges should be considered as specifically disclosed herein.

Figure 1:
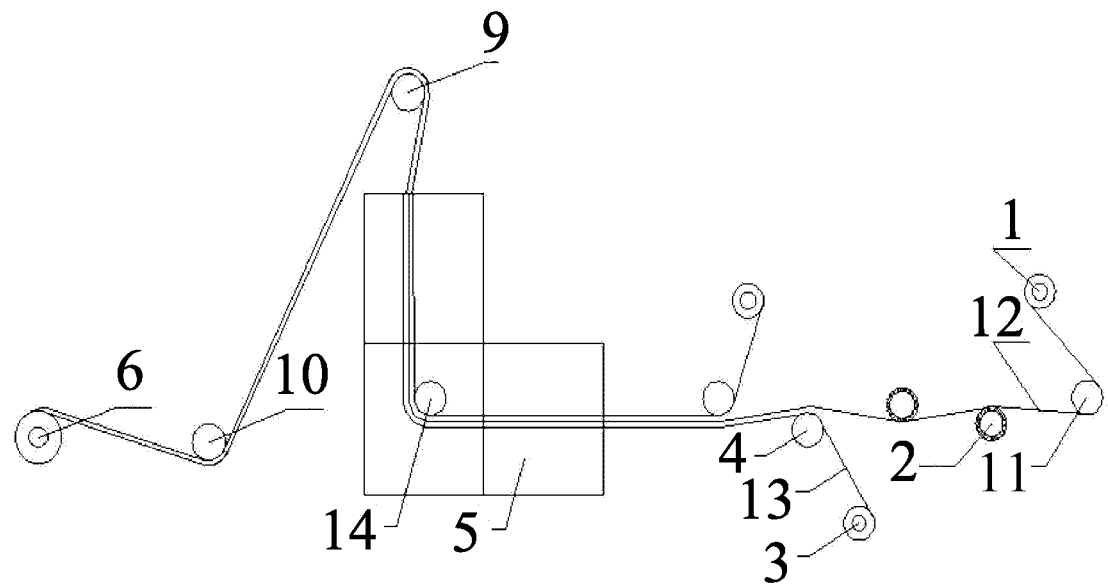
FIG. 1 shows the structure of a coating device for a heat-resistant multi-layer composite lithium-ion battery separator in the invention.

According to the first aspect of the invention, the invention provides a heat-resistant multi-layer composite lithium-ion battery separator, as shown in FIG. 1, the battery separator comprising: a base membrane 12 having two end faces provided with a coating paste, wherein the end faces of the base membrane 12 are both adhered with a composite layer via the coating paste, the composite layer comprises one, two, or multiple composite films 13, the composite films 13 are adhered and fixed via the coating paste.

According to the first aspect of the invention, the base membrane 12 and the composite films 13 are PP separator, PE separator, nonwovens or fiber separately.

According to the first aspect of the invention, wherein the coating paste comprises $Al_2O_3$ ceramic paste, PVDF paste, $ZrO_2$ ceramic paste or $SiO_2$ paste, the coating paste is further added with adhesive, disperser, gelata, plastifier, antioxidant, cross-linker and deionized water.

By weight percent in the coating paste, the $Al_2O_3$ ceramic paste, PVDF paste, $ZrO_2$ ceramic paste or $SiO_2$ paste is 20-40% of the total weight of the coating paste, the adhesive is 3-6%, the disperser is 0.2-0.5%, the gelata is 0.2-0.5%, the plastifier is 0.05-0.2%, the antioxidant is 0.05-0.2%, the cross-linker is 0.05-0.2%, the rest is the deionized water.

In the invention, the coating paste also comprises combinations of more than two from $Al_2O_3$ ceramic paste, PVDF paste, $ZrO_2$ ceramic paste and $SiO_2$ paste.

There is no specific limitation to the adhesive, disperser, gelata, plastifier, antioxidant and cross-linker in the invention, and all can be selected with the reference of the prior art. Typically, the adhesive is selected, for example, from a polyacrylate aqueous binder. The disperser is selected from the ammonium polyacrylate and/or polyamides. The gelata is selected, for example, from agarose. The plastifier is selected, for example, from DEHP. The antioxidant is, for example, 2-hydroxy-4-methoxybenzophenone. The cross-linker is, for example, trimethylolpropane tris-acrylate.

The multi-layer composite lithium-ion battery separator of the invention has high heat-resistant performance: conventional separators adapting wet or dry coating process are severely deformed at 200° C., but the battery separator of the invention remains intact at 200° C.: the shrinking rate after 1 hour at 200° C. is MD<2.0, TD<1.5, and the thermal performance is obviously better than that of conventional coating separator. The air permeability of the conventional two-side coating separator with a thickness of about 22 μm (for example, 20-24 μm) is generally less than 380 s/100 mL, and the air permeability of the invention is generally less than 300 s/100 mL. The values of the air permeability refers to the time required for a certain area of the separator to pass a certain amount of gas under a certain pressure, which means that the larger the air permeability value, the more the internal resistance of the separator, while the smaller the air permeability value, the less the internal resistance of the separator and the faster the charge and discharge speed, thereby the internal resistance of the battery separator in the invention is significantly less than that of conventional coating separators. The electrolyte uptake of the battery separator in the invention is significantly improved compared with the conventional coating separators, and the amount of the electrolyte absorbed in per unit volume is relatively high, thereby the ionic conductivity of the battery is high and the charge and discharge performance of the battery is better.

According to the second aspect of the invention, the invention provides a coating device for the heat-resistant multi-layer composite lithium-ion battery separator, as shown in FIG. 1, the coating device comprises a base membrane uncoiling reel 1, a coating roller 2, a heating and drying mechanism, and a coiling reel 6, which are arranged in sequence, the base membrane uncoiling reel 1 is wound with the base membrane 12, and one end of the base membrane 12 is protruded from the base membrane uncoiling reel 1 and is wound on the coiling reel 6, the surface of the coating roller 2 is provided with the coating paste, wherein, a composite film uncoiling mechanism comprising composite films 13 is additionally provided and wound between the coating roller 2 and the heating and drying mechanism, on the same side of the base membrane 12, the coating roller 2 is arranged in an one-to-one correspondence to the composite film uncoiling mechanism to form an attaching unit of the composite films 13, the attaching unit is two sets provided on two sides of the base membrane 12, the composite film uncoiling mechanism comprises a composite film uncoiling reel 3 and a pressing shaft 4, and the composite films 13 are protruded from the composite film uncoiling reel 3 and attached to the base membrane 12 after passing through the pressing shaft 4, the coating roller 2 and the pressing shaft 4 are pressed against the end face of the base membrane 12 on the corresponding side.

The coating paste may be the coating paste from the first aspect of the invention.

Preferably, the base membrane 12 and the composite films 13 are PP separator, PE separator, nonwovens or fiber separately.

Preferably, a tensioning shaft 11 is provided between the base membrane uncoiling reel 1 and the coating roller 2, under the circumstances, after the base membrane uncoiling reel 1 protruding the base membrane 12, the base membrane 12 is first tensioned by the tensioning shaft 11, and then passes through the coating roller 2.

According to the coating device of the invention, in order to meet the requirements for safety and heat-resistant performance in different occasions, a multiple sets of the coating roller 2 and the composite film uncoiling mechanism may be disposed on both sides of the coated ceramic coating separator in the coating device, each of the coating roller 2 and the corresponding composite film uncoiling mechanism can realize the coating and attaching of one layer of the composite film to form a double-layer composite, three-layer composite or multi-layer composite battery separator.

Preferably, in order to control coating thickness and uniformity, the coating roller 2 is evenly arranged with troughs with certain depth, number of lines per inch, shapes and angles. Wherein, the depth of the troughs is 10-120 μm, the number of lines per inch (LPI) of the troughs generally is 100-1400, the shape of the trough may be a honeycomb, a rhombus, a gulfstram, or an oblique line, and preferably is an oblique line, the angle of the oblique line may be 30°, 45° or 60°.

As a preferred embodiment, a tension speed control device and a deviation rectifying device provided in the composite film uncoiling mechanism. The power of the composite film uncoiling reel 3 is derived from an uncoiling servo motor, and the tension speed control device is a tension sensor arranged on the composite film uncoiling reel 3, the information input end of the tension sensor is connected to the composite film uncoiling reel 3, and the output end thereof is connected to the uncoiling servo motor, the tension sensor can detect and feed back the speed and tension of the composite film uncoiling reel 3, and when there is a difference between the detected value and the set value, the uncoiling servo motor makes corresponding adjustments to change the torque and the rotational speed of the motor to ensure the actual tension and speed are consistent with the set values. The deviation rectifying device is a commonly used rectifying device on the prior strip production line, during the conveying process of the composite film 13, the tension speed control device can ensure that the conveying line speed of the composite film uncoiling reel 3 and the base membrane 12 are consistent and can control the uncoiling tension of the composite film uncoiling reel 3, the deviation rectifying device can ensure a higher contact ratio between the composite film 13 and the ceramic coating separator to form a multi-layer composite separator after attaching.

According to the coating device in the invention, the heating and drying mechanism comprises multiple ovens connected in sequence, the specific number of the ovens can be selected according to the separator conveying speed in production. Preferably, the heating and drying mechanism comprises three ovens 5 connected in sequence. An air inlet fan and an air exhaust fan are provided in all three ovens 5.

Preferably, the three ovens 5 are arranged as a vertical corner shape, a rotating shaft 14 is provided in the oven which is at the corner, the base membrane 12 passes through the rotating shaft 14 and also passes through the three ovens 5 in sequence. Both sides of the multi-layer composite separator need to composite, and the multi-layer composite separator does not contact any roller surface before entering the heating and drying mechanism, and it is suspended and has a long distance before drying, the multi-layer composite separator is greatly affected by its own gravity, and changes direction by the rotating shaft 14 after being out of the second oven where the multi-layer composite separator is basically dried and shaped, which can reduce the influence of the gravity of the multi-layer composite separator to make the device more compact.

According to the coating device of the invention, the length of the heating and drying mechanism is related to the line speed (i.e. conveying speed) of the base membrane uncoiling reel 1 during operation, the conveying speed is positively correlated with the length of the heating and drying mechanism, that is, the faster the conveying speed, the longer the heating and drying mechanism, and the line speed is generally 5-30 m/min. According to a preferred embodiment, the line speed of the base membrane uncoiling reel 1 is 5-15 m/min, the length of the heating and drying mechanism is 9 m. According to another preferred embodiment, the line speed of the base membrane uncoiling reel 1 is 15-30 m/min, the length of the heating and drying mechanism is 18 m.

Preferably, a flattening roller 9 and a tensioning roller 10 are sequentially provided between the output end of heating and drying mechanism and the coiling reel 6, the flattening roller 9 is arranged at the output end of heating and drying mechanism. The multi-layer composite separator is flattened by the flattening roller 9, and tensioned and held by the tensioning roller 10 after being flattened, and finally the relatively flat multi-layer separator is obtained.

Figure 2:
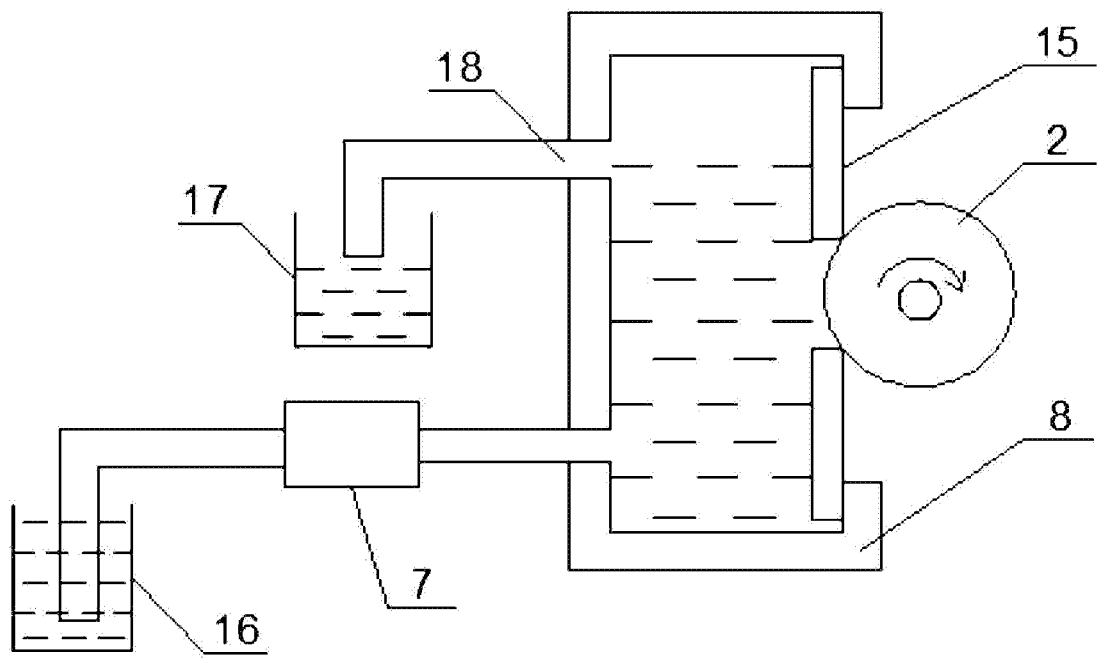
FIG. 2 is a schematic view of a supply device for a coating paste in the invention.

According to the coating device of the invention, in order to supply the coating paste to the coating roller 2, the coating device further includes a supply device for coating the paste shown in FIG. 2. The supply device for the coating device comprises a charging pump 7, a coating trough 8, a raw material barrel 16 and a recycling barrel 17, wherein the input end of the charging pump 7 is connected to the raw material barrel 16 to suck the coating paste, and the output thereof conveys the coating paste to the coating trough 8, two doctor blades 15 is provided on the open end of the coating trough, two doctor blades 15 is parallel with the opening and are in contact with the outer surface of the coating roller 2 to form a closed chamber, the coating roller 2 is rotated and attached the coating paste by passing through the coating trough 8, in the process herebefore, a frictioning passing through the two doctor blades 15 is comprised, which makes the thickness of the coating paste on the coating roller 2 uniform; the coating trough 8 is provided with an overflow port 18, when the rotational speed of the charging pump 7 is high, the provided coating paste may overflow along the overflow port 18, and the overflowed coating paste may be stored in the recycling barrel 17 for recycling.

In the invention, the appropriate rotational speed of the charging pump 7 can be selected according to the coating amount and the production speed, wherein, the faster the production speed is, the larger the amount of required coating paste is, the coating thickness can be ensured when the coating paste is enough, and when the amount of the coating paste is too high, the redundant coating paste is collected and recycled through the overflow port 18, therefore, the rotational speed of the charging pump 7 can be adjusted at any time according to the overflow condition of the overflow port 18 during operation. Generally, the charging pump 7 can have a rotational speed of 15-45 rpm and the speed ratio of the coating roller is of 50-90%.

The coating device of the invention has a simple structure, which provides a more mature device for the manufacturing of the multi-layer composite battery separator, greatly improves the production efficiency of the lithium-ion battery separator, and the quality of the produced separator products is relatively stable.

According to the third aspect of the invention, the invention provides a manufacturing method for the heat-resistant multi-layer composite lithium-ion battery separator in the first aspect of the invention, the manufacturing method employs the coating device, the structure of the coating device described in the second aspect is employed during manufacturing heat-resistant multi-layer composite lithium-ion battery separator, and the manufacturing method comprises the following steps:

A. base membrane uncoiling: the base membrane uncoiling reel 1 protrudes the base membrane 12, and the base membrane 12 moves towards the coiling reel 6, the uncoiling tension of the base membrane uncoiling reel 1 against the base membrane 12 is 15-30N;

B. base membrane coating: the base membrane 12 passes through the coating roller 2 on both sides, the coating roller 2 is pressed against the end face of the base membrane 12 on the corresponding side, and corresponding end face of the base membrane 12 is provided with the coating paste to form coating separator;

C. multi-layer composite: the coating separator passes through composite film uncoiling mechanism arranged on both sides thereof, the composite film uncoiling reel 3 rotates and protrudes the composite films 13, the uncoiling tension of the composite film uncoiling reel 3 against the composite films 13 is 15-30N, the composite films 13 is attached to corresponding end face of the coating separator after passing through the pressing shaft 4, and the pressing shaft 4 are pressed against the attaching position to form a multi-layer composite separator;

D. multiple composite: with each additional layer of the composite films 13 on the end face of the coating separator, it is necessary to repeat steps B and C once, and after the outermost composite film is attached, the next process is proceeded after a delivery time of 0.2-0.5 s;

E. heating and shaping: putting the multi-layer composite separator into the heating and drying mechanism, and the time of conveying through the heating and drying mechanism is 0.6-1.8 min, the tension of the multi-layer composite separator in the heating and drying mechanism is maintained at 7-15N, the final product of multi-layer composite lithium-ion battery separator is obtained after heating and shaping the multi-layer composite separator;

F. product coiling: coiling the multi-layer composite lithium-ion battery separator through the coiling reel 6, and the coiling tension is 4-12N.

Preferably, in the step A, a tensioning shaft 11 is provided between the base membrane uncoiling reel 1 and the coating roller 2, after the base membrane uncoiling reel 1 protruding the base membrane 12, the base membrane 12 is first tensioned by the tensioning shaft 11, and then passes through the coating roller.

In the step C-D, when the composite films 13 are selected from a nonwovens, the coating layer is absorbed by the nonwovens during the composite process, for the electrolyte uptake of nonwovens separators is high and the coating may be absorbed by the nonwovens, thereby the thinner multi-layer composite lithium-ion battery separator can be manufactured.

Preferably, in the step E, the heating and drying mechanism comprises three ovens 5 connected in sequence, the three ovens 5 are arranged as a vertical corner shape, a rotating shaft 14 is provided in the oven which is at the corner, the multi-layer composite separator passes through the rotating shaft 14 and also passes through the three ovens 5 in sequence to be dried and shaped. The temperature in the three ovens 5 is set to 50-60° C., 60-70° C. and 50-60° C., respectively. An air inlet fan and an air exhaust fan are provided in all three ovens 5 and the inlet and exhaust air frequencies in the three ovens 5 are set to 12-25 Hz.

Preferably, in the step F, a flattening roller 9 and a tensioning roller 10 are sequentially provided between the heating and drying mechanism and the coiling reel 6, the final product of heated multi-layer composite separator is flattened by the flattening roller 9, tensioned and held by the tensioning roller 10 after being flattened, and finally the relatively flat multi-layer composite separator is coiled by the coiling reel 6.

According to the manufacturing method for the invention, the distance between the pressing shaft 4 and the coating roller 2 is as close as possible, thereby the conveying time may be shortened, while the distance between the pressing shaft 4 and the heating and drying mechanism may be appropriately farther, and after the composite films 13 being attached to the base membrane 12, to maintain the conveying time at 0.2 s to 0.5 s, and reach the heating and drying mechanism thereafter, and the 0.2-0.5 s of conveying time can ensure the contact time of the composite films 13 and the coating paste, thereby the composite films 13, the coating paste and the base membrane 12 are fully infiltrated, which is beneficial to the attachment between the base membrane 12 and the composite films 13.

In addition, the coating device adopted in the manufacturing method is the coating device in the second aspect of the invention, therefore, in addition to the description in the third aspect of the invention, other descriptions of the coating device are as described in the second aspect of the invention, and are not described herein again.

The manufacturing method of the invention provides a relatively mature and stable production process for manufacturing the heat-resistant multi-layer composite lithium-ion battery separator, wherein the arrangement of each process is performed for the mechanism of the heat-resistant multi-layer composite lithium ion battery separator mechanism, the interval time between the processes can make the final product quality high and stable.

The features of the invention are further illustrated by the following embodiments, but the contents of the invention are not limited by the embodiments.

In the coating paste of the following embodiments and comparative embodiments, the adhesive is polyacrylate aqueous binder, the disperser is polyamides, the gelata is agarose, the plastifier is DEHP, the antioxidant is 2-hydroxy-4-methoxybenzophenone, the cross-linker is trimethylolpropane tris-acrylate; the coating thickness refers to the designed dry film thickness.

In following embodiments, the multi-layer composite battery separator is manufactured in combination with the coating device shown in FIG. 1 and the supply device of the coating shown paste in FIG. 2. Wherein the heating and drying mechanism comprises three ovens 5, the three ovens 5 are arranged as a vertical corner shape, and the ovens are infra-red heating ovens, a rotating shaft 14 is provided in the oven which is at the corner, the length of each oven is set to 3 m, and the total length of three ovens 5 is 9 m, and an air inlet fan and an air exhaust fan are provided in all three ovens 5. A tension speed control device and a deviation rectifying device provided in the composite film uncoiling mechanism, and the specific description of the tension speed control device and the deviation rectifying device is as described above.

The air permeability of the battery separator was tested by a Gurley Model 4340 densometer according to ISO 5636; the heat-resistant shrinking rate was tested in accordance with ISO 14616. The test method of the electrolyte uptake (EU) is: weighting the battery separator and recording as $W_0(g)$; in an argon-filled glovebox, immersing the weighted battery separator in 1 mol/L $LiPF_6$/EC:DMC:DEC=1:1:1(v/v/v) for 15 minutes, using the filter paper to gently suck off the excess electrolyte on the surface of the separator after taking out, the weighting and recording as $W_1(g)$, the calculation formula of the electrolyte uptake (EU) is: $EU=(W_0-W_1)/W_0\times 100\%$, each group of separator was tested 10 times and then averaging.

Embodiment 1

The adopted base membrane in this embodiment is PE separator having a thickness of 6 μm; the composite film is PET nonwovens separator, and each layer has a thickness of 9 μm.

The composition of the coating paste is: 22% of PVDF paste+aluminium oxide (the mass ratio is 3:7), 5% of adhesive, 0.4% of disperser, 0.3% of gelata, 0.1% of plastifier, 0.1% of antioxidant, 0.1% of cross-linker, and the rest is the deionized water.

The manufacturing method for multi-layer composite lithium-ion battery separator comprises the following steps:

A. base membrane uncoiling:

the base membrane uncoiling reel 1 protrudes the base membrane 12, and the base membrane 12 moves towards the coiling reel 6, the base membrane uncoiling reel 1, the base membrane 12 and the coiling reel 6 are at the same line speed after rotation, the line speed is 10 m/min, a tensioning shaft 11 is provided between the base membrane uncoiling reel 1 and the coating roller 2, the tensioning shaft 11 also detects the tension as a tension detecting roller, the thickness, width and moving line speed of the base membrane 12 jointly affect the uncoiling tension, and the tensioning shaft 11 is adjusted to make the uncoiling tension of the base membrane uncoiling reel 1 against the base membrane 12 is 20N;

B. base membrane coating:

the tensioned base membrane 12 passes through the coating roller 2 on both sides, the coating roller 2 is pressed against the end face of the base membrane 12 on the corresponding side, and the coating paste is attached on the corresponding end face of the base membrane 12, the coating thickness of the coating paste on each end face is 2.0 μm, the coating roller 2 is evenly provided with troughs, the depth of the troughs is 50 μm, the number of lines per inch (LPI) is 180, the shape of the troughs is an oblique line, the angle of the oblique line is 30°, the coating roller 2 performs continuous supply of the coating paste by means of the charging pump 7 and the coating trough 8, and the rotational speed of the charging pump 7 is set to 30 rpm, and the speed ratio of the coating roller is set to 70%;

C. multi-layer composite:

the coating separator passes through composite film uncoiling mechanism arranged on both sides thereof, the composite film uncoiling reel 3 rotates and protrudes the composite films 13, the uncoiling tension is 25N, the composite films 13 is attached to corresponding end face of the coating separator after passing through the pressing shaft 4, and the pressing shaft 4 are pressed against the attaching position to form a multi-layer composite separator, after the attachment of the composite films, the next process is proceeded after a delivery time of 0.4 s, for the conveying speed is 10 m/min, the distance from the pressing shaft 4 to the heating and drying mechanism is calculated to be ¹⁄₁₅ m.

E. heating and shaping:

putting the multi-layer composite separator into the heating and drying mechanism, and the time of conveying through the heating and drying mechanism is 0.9 min, the tension of the multi-layer composite separator in the heating and drying mechanism is maintained at 10N, the temperature in the three ovens 5 is set to 55° C., 65° C. and 55° C., respectively, and the inlet and exhaust air frequencies of the ovens are set to 20 Hz, the final product of multi-layer composite lithium-ion battery separator is obtained after heating and shaping the multi-layer composite separator;

F. product coiling:

a flattening roller 9 and a tensioning roller 10 are sequentially provided between the ovens 5 and the coiling reel 6, the final product of multi-layer composite separator is flattened by the turning of the flattening roller 9, the multi-layer composite separator completes the process from up to down by two corners and finally reaches the tensioning roller 10 and the coiling reel 6, the flattened shape thereof is stable, and finally the relatively flat multi-layer composite lithium-ion battery separator is collected on the coiling reel 6, the coiling tension is 10N.

The features of the prepared multi-layer composite lithium-ion battery separator are shown in Table 1.

Embodiment 2

The adopted base membrane in this embodiment is PE separator having a thickness of 6 μm; the composite film is PET nonwovens separator, and each layer has a thickness of 9 μm.

The composition of the coating paste is: 30% of $Al_2O_3$ ceramic paste, 5% of adhesive, 0.3% of disperser, 0.4% of gelata, 0.1% of plastifier, 0.1% of antioxidant, 0.1% of cross-linker, and the rest is the deionized water.

The manufacturing method for the multi-layer composite lithium-ion battery separator comprises the following steps:

A. base membrane uncoiling:

the base membrane uncoiling reel 1 protrudes the base membrane 12, and the base membrane 12 moves towards the coiling reel 6, the base membrane uncoiling reel 1, the base membrane 12 and the coiling reel 6 are at the same line speed after rotation, the line speed is 10 m/min, a tensioning shaft 11 is provided between the base membrane uncoiling reel 1 and the coating roller 2, the tensioning shaft 11 also detects the tension as a tension detecting roller, the thickness, width and moving line speed of the base membrane 12 jointly affect the uncoiling tension, and the tensioning shaft 11 is adjusted to make the uncoiling tension of the base membrane uncoiling reel 1 against the base membrane 12 is 22N;

B. base membrane coating:

the tensioned base membrane 12 passes through the coating roller 2 on both sides, the coating roller 2 is pressed against the end face of the base membrane 12 on the corresponding side, and the coating paste is attached on the corresponding end face of the base membrane 12, the coating thickness of the coating paste on each end face is 2.0 μm, the coating roller 2 is evenly provided with troughs, the depth of the troughs is 55 μm, the number of lines per inch (LPI) is 170, the shape of the troughs is an oblique line, the angle of the oblique line is 60°, the coating roller 2 performs continuous supply of the coating paste by means of the charging pump 7 and the coating trough 8, and the rotational speed of the charging pump 7 is set to 30 rpm, and the speed ratio of the coating roller is set to 70%;

C. multi-layer composite:

the coating separator passes through composite film uncoiling mechanism arranged on both sides thereof, the composite film uncoiling reel 3 rotates and protrudes the composite films 13, the uncoiling tension is 22N, the composite films 13 is attached to corresponding end face of the coating separator after passing through the pressing shaft 4, and the pressing shaft 4 are pressed against the attaching position to form a multi-layer composite separator, after the attachment of the composite films, the next process is proceeded after a delivery time of 0.4 s, for the conveying speed is 10 m/min, the distance from the pressing shaft 4 to the heating and drying mechanism is calculated to be ⅟₁₅ m;

E. heating and shaping:

the multi-layer composite separator passes through the rotating shaft 14 and also passes through the three ovens 5 in sequence, and the time of conveying through the heating and drying mechanism is 0.9 min, the tension of the multi-layer composite separator in the heating and drying mechanism is 10N, the temperature in the three ovens 5 is set to 55° C., 65° C. and 55° C., respectively, and the inlet and exhaust air frequencies of the ovens are set to 18 Hz, the final product of multi-layer composite lithium-ion battery separator is obtained after heating and shaping the multi-layer composite separator;

F. product coiling:

a flattening roller 9 and a tensioning roller 10 are sequentially provided between the ovens 5 and the coiling reel 6, the final product of multi-layer composite separator is flattened by the turning of the flattening roller 9, the multi-layer composite separator completes the process from up to down by two corners and finally reaches the tensioning roller 10 and the coiling reel 6, the flattened shape thereof is stable, and finally the relatively flat multi-layer composite lithium-ion battery separator is collected on the coiling reel 6, the coiling tension is 8N.

The features of the prepared multi-layer composite lithium-ion battery separator are shown in Table 1.

Comparative Embodiment 1

The comparative embodiment provides a manufacturing method for a conventional wet coating separator. Wherein the base film is PE separator having a thickness of 20 μm, the separator is prepared by the coating device of the above embodiment, except that the coating device herein is not provided with a composite film uncoiling mechanism for winding the composite film.

A. base membrane uncoiling:

the base membrane uncoiling reel 1 protrudes the base membrane 12, and the base membrane 12 moves towards the coiling reel 6, the base membrane uncoiling reel 1, the base membrane 12 and the coiling reel 6 are at the same line speed after rotation, the line speed is 10 m/min, a tensioning shaft 11 is provided between the base membrane uncoiling reel 1 and the coating roller 2, the tensioning shaft 11 also detects the tension as a tension detecting roller, the thickness, width and moving line speed of the base membrane 12 jointly affect the uncoiling tension, and the tensioning shaft 11 is adjusted to make the uncoiling tension of the base membrane uncoiling reel 1 against the base membrane 12 is 22N;

B. base membrane coating:

the tensioned base membrane 12 passes through the coating roller 2 on both sides, the coating roller 2 is pressed against the end face of the base membrane 12 on the corresponding side, and the coating paste is attached on the corresponding end face of the base membrane 12, the coating thickness of the coating paste on each end face is 2.0 μm, the coating roller 2 is evenly provided with troughs, the depth of the troughs is 55 μm, the number of lines per inch (LPI) is 180, the shape of the troughs is an oblique line, the angle of the oblique line is 60°, the coating roller 2 performs continuous supply of the coating paste by means of the charging pump 7 and the coating trough 8, and the rotational speed of the charging pump 7 is set to 30 rpm, and the speed ratio of the coating roller is set to 70%;

C. heating and shaping:

the monolayer composite separator passes through the rotating shaft 14 and also passes through the three ovens 5 in sequence, and the time of conveying through the heating and drying mechanism is 0.9 min, the tension of the monolayer composite separator in the heating and drying mechanism is 10N, the temperature in the three ovens 5 is set to 55° C., 65° C. and 55° C., respectively, and the inlet and exhaust air frequencies of the ovens are set to 18 Hz, the final product of lithium-ion battery separator is obtained after heating and shaping the coating separator;

D. product coiling:

a flattening roller 9 and a tensioning roller 10 are sequentially provided between the ovens 5 and the coiling reel 6, the final product of the coating separator is flattened by the turning of the flattening roller 9, the coating separator completes the process from up to down by two corners and finally reaches the tensioning roller 10 and the coiling reel 6, the flattened shape thereof is stable, and finally the relatively flat lithium-ion battery separator is collected on the coiling reel 6, the coiling tension is 8N.

The features of the prepared multi-layer composite lithium-ion battery separator are shown in Table 1.

TABLE 1

| Item | Unit | | Comparative Embodiment 1 Test value | Embodiment 1 Test value | Embodiment 2 Test value |
|---|---|---|---|---|---|
| Thickness | μm | | 24.0 | 24.0 | 24.0 |
| Shrinking rate (200° C. × 1 h) | Vertical direction | % | 5.5 | 1.5 | 1.7 |
| | Horizontal direction | % | 3.7 | 0.7 | 0.8 |
| Air permeability | Sec/100 ml | | 317 | 245 | 238 |
| Electrolyte uptake | % | | 163 | 235 | 214 |

Comparing Embodiment 1-2 with Comparative Embodiment 1, it can be seen in accordance with the data of Table 1, that the multi-layer composite lithium-ion battery separators of Embodiment 1-2 have higher heat-resistant performance and less internal resistance, and the amount of the electrolyte absorbed in per unit volume is relatively high, thereby the charge and discharge performance of the batteries is better.

The preferred embodiments of the invention have been described in detail above, however, the invention is not limited thereto. Within the scope of the technical idea of the invention, various simple modifications can be made to the technical schemes of the invention, including various technical features combined in any other suitable manner, and these simple variations and combinations should also be regarded as the disclosure of the invention and included within the scope of protection of the invention.

What is claimed is:

1. A heat-resistant multi-layer composite lithium-ion battery separator, comprising: a base membrane (12) having two end faces provided with a coating paste, wherein the end faces of the base membrane (12) are both adhered with a composite layer via the coating paste, the composite layer comprises one, two, or multiple composite films (13), the composite films (13) are adhered and fixed via the coating paste;

wherein the base membrane (12) and the composite films (13) are PP separator, PE separator, nonwovens or fiber separately;

wherein the coating paste comprises $Al_2O_3$ ceramic paste, PVDF paste, $ZrO_2$ ceramic paste or $SiO_2$ paste, the coating paste is further added with adhesive, disperser, gelata, plastifier, antioxidant, cross-linker and deionized water, wherein the $Al_2O_3$ ceramic paste, PVDF paste, $ZrO_2$ ceramic paste or $SiO_2$ paste is 20-40% of the total weight of the coating paste, the adhesive is 3-6%, the disperser is 0.2-0.5%, the gelata is 0.2-0.5%, the plastifier is 0.05-0.2%, the antioxidant is 0.05-0.2%, the cross-linker is 0.05-0.2%, the rest is the deionized water.

* * * * *